J. J. VICKERS.
COTTON CHOPPER.
APPLICATION FILED SEPT. 3, 1909.
961,181. Patented June 14, 1910.
2 SHEETS—SHEET 1.
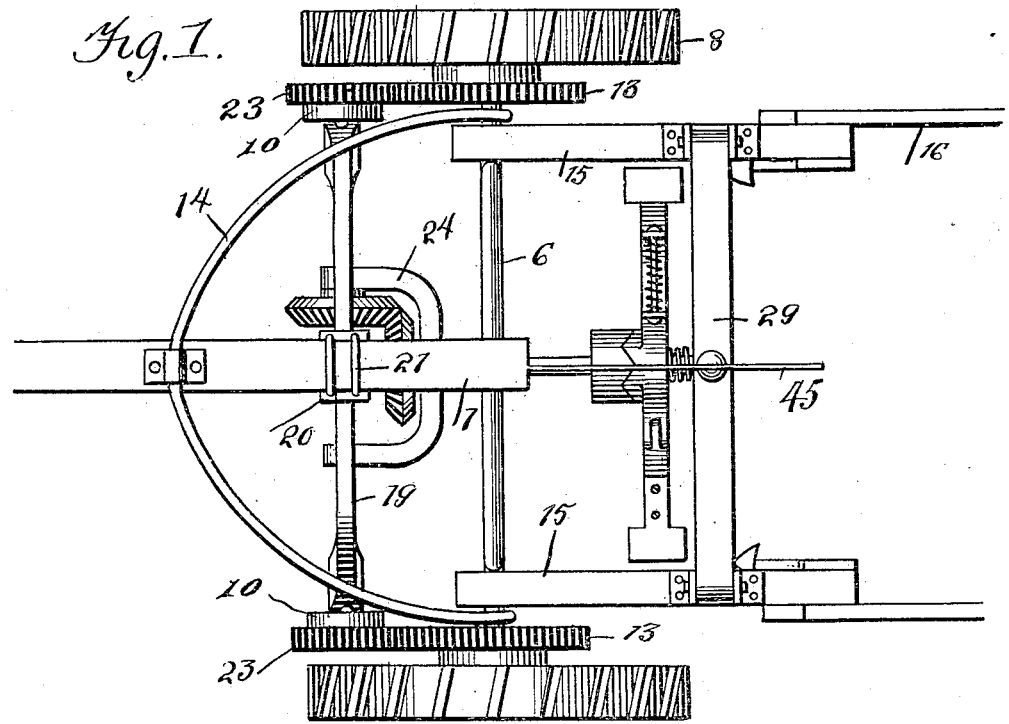
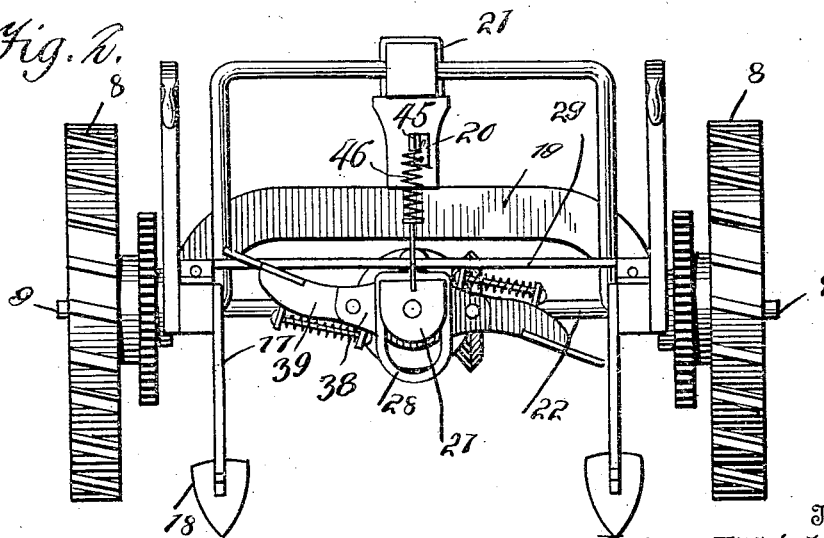

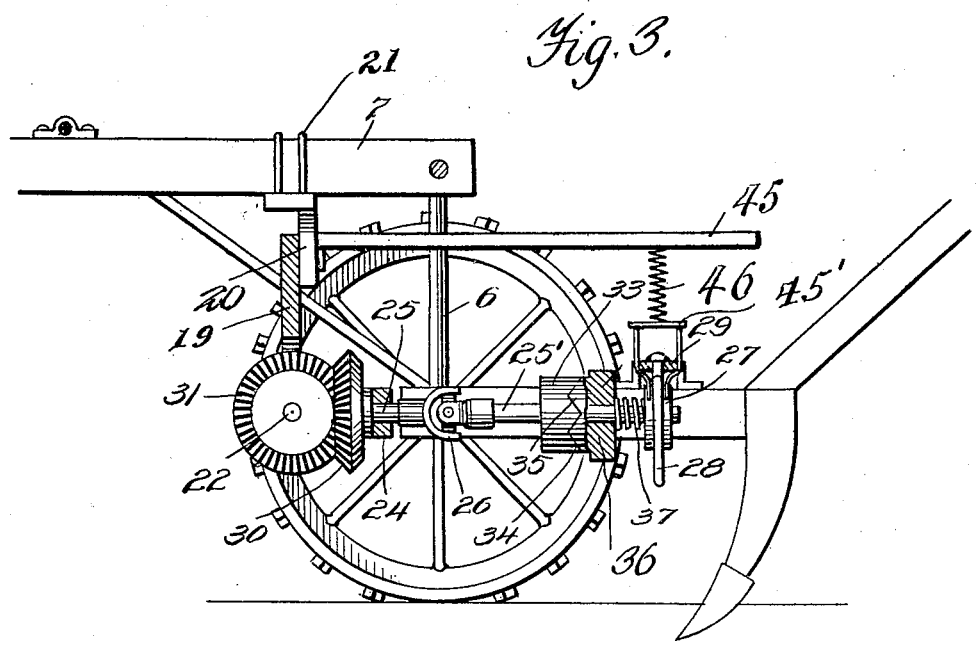
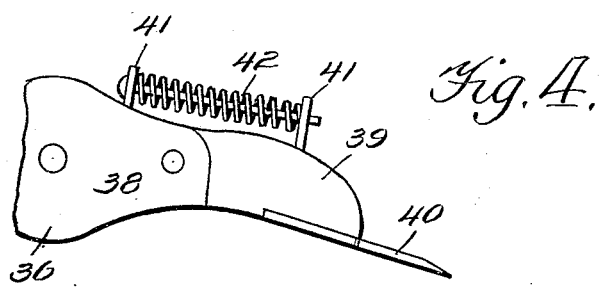
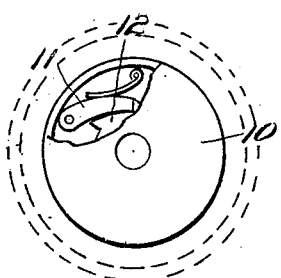

UNITED STATES PATENT OFFICE.

JOHN J. VICKERS, OF LEESBURG, TEXAS.

COTTON-CHOPPER.

961,181.

Specification of Letters Patent. Patented June 14, 1910.

Application filed September 3, 1909. Serial No. 516,603.

*To all whom it may concern:*

Be it known that I, JOHN J. VICKERS, a citizen of the United States, residing at Leesburg, in the county of Camp and State of Texas, have invented new and useful Improvements in Cotton-Choppers, of which the following is a specification.

This invention relates to cotton choppers and it has for its object to provide a cotton chopping attachment which may be readily applied to and used in connection with the frame of a cultivator of any well known standard construction.

A further object of the invention is to provide a cotton chopping attachment for cultivators which may be readily applied or detached as occasion may demand and which shall not in any wise interfere with the operation of the cultivator as such.

Further objects of the invention are to simplify and improve the construction and operation of this class of devices.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention; it being however understood that no limitation is necessarily made to the precise structural details herein exhibited but that changes, alterations and modifications within the scope of the invention may be resorted to when desired.

In the drawings: Figure 1 is a top plan view showing a cultivator equipped with the improved cotton chopping attachment. Fig. 2 is a rear elevation of the same. Fig. 3 is a longitudinal vertical sectional elevation. Fig. 4 is a detail view in rear elevation and on a somewhat enlarged scale of one of the chopping hoes and its supporting arm. Fig. 5 is a detail view illustrating the clutch mechanism connected with one of the operating gears.

Corresponding parts in the several figures are denoted by like characters of reference.

6 designates the ordinary arched axle of a cultivator of conventional construction, and 7 is the cultivator tongue which is connected with the axle as is usually the case. The cultivator wheels 8 are mounted for rotation in the customary manner upon the spindles 9 of the axle and said wheels are for the purposes of the present invention, provided with spur wheels 13 which are suitably connected with the transporting wheels for rotation therewith. Braces 14 connect the tongue 7 with the spindles 9; and cultivator beams 15 are hingedly connected with said spindles in the customary or in any convenient manner, said beams being equipped with handles 16 and with standards 17 carrying the cultivator blades 18.

The cultivator attachment comprises an arched frame member 19 having an upright 20 which is connected with the cultivator tongue by means of clips 21. The frame 19 is provided with bearings for the transverse shaft 22 carrying pinions 23 that engage the spur wheels 13 from which the shaft 22 derives motion. The pinions 23 which are loosely mounted upon the shaft 22 are connected with said shaft for rotation by clutch mechanism including hub-like casings 10 that are suitably connected with the pinions, said casings containing spring actuated pawls 11 engaging ratchet wheels 12 which latter are securely mounted upon the shaft in such a manner that the latter will be rotated by the movement derived from the transporting wheels of the cultivator when the latter is traveling in a forward direction. The shaft 22 supports a yoke 24 which affords a bearing for the forward end of a shaft section 25, the rear end of which is connected by a universal joint 26 with a second shaft section 25′, a bearing for which is provided in a block 27 that is fitted to slide vertically in a frame 28 depending from a cross bar 29 the ends of which are supported upon and hingedly connected with the cultivator beams 15 which latter will thus be capable of independent movement in approximately vertical planes.

The shaft section 25 carries at its forward extremity a miter gear 30 meshing with a miter gear 31 upon the shaft 22 from which motion will thus be transmitted to the shaft sections 25—25′ which, as previously stated are connected together by the universal joint 26. The shaft section 25′ carries a disk 33, the rear face of which is formed with teeth 34 that are beveled in opposite directions and are engaged by correspondingly shaped teeth 35 upon the hub of the chopper disk 36 which is loosely mounted upon the shaft section 25' and is held in engagement with the toothed disk 33 by the action of a spring 37 which is interposed between the chopper disk and the block 27; the interengaging teeth of the disks 33 and 36 thus coöperate to form a clutch whereby said disks are normally connected for rotation but which will permit the chopper disk to yield in a rearward direction when placed under stress or tension. The chopper disk is provided with radially extending arms 38 with which brackets 39 carrying the chopping hoes 40 are hingedly connected; said arms and brackets being equipped with laterally extending lugs 41 between which is interposed a spring 42 whereby the hoe carrying bracket is normally held to its work but which will permit it to yield if any obstruction should be encountered.

For the purpose of enabling the cotton chopping mechanism to be conveniently raised from or lowered toward the ground at the will of the operator, a lever or handle 45 is pivotally connected with the supporting block or upright 20; said lever being connected with the block 27 by suitable connecting means preferably including a yoke 45' and a coil spring 46 of sufficient strength to support the lever in a raised position with reference to the block 27 and the parts connected with the latter and also of sufficient strength to support said block and related parts in raised position when elevated from the ground. By depressing the lever handle 45, the spring 46 will exercise a downward pressure upon the block 27 which together with the parts connected therewith will thus be flexibly projected into engagement with the ground.

As will be seen from the foregoing description, the mechanism of the improved cotton chopper comprises mainly, the yoke or frame 19 together with the cross bar 29 and related parts; the said cotton chopping attachment may be readily applied to and connected with an ordinary cultivator, the wheels of which are equipped with gearing for actuating the cotton chopping mechanism. The presence of the latter does not interfere with the ordinary operation of the cultivator beams with which the cross bar 29 is hingedly connected.

The operation of the cotton chopping mechanism is well understood and does not require to be enlarged upon.

Having thus described the invention, what is claimed is—

1. A cotton chopping attachment for cultivators including an arched frame member, means for connecting the same with the tongue of a cultivator, a shaft supported for rotation in the arched frame member and adapted to receive motion from the cultivator wheels, a yoke supported upon the shaft, a cross bar hingedly connected with the cultivator beams, a frame depending from the cross bar, and a chopper carrying shaft supported for rotation in the yoke and in a block vertically movable in the depending frame, said shaft being geared to the shaft supported in the arched frame.

2. In a cotton chopping attachment for cultivators, an arched frame adapted to be connected with a cultivator tongue, a cross bar adapted to be supported upon and hingedly connected with a pair of cultivator beams, a shaft journaled in the arched frame, a block connected with the cross bar for vertically sliding movement, a yoke connected with the shaft journaled in the arched frame, a shaft comprising sections universally jointed together and supported for rotation in the yoke and in the vertically movable block, a spring pressed chopper disk mounted upon one of the shaft sections, clutch means connecting the chopper disk with the shaft section, and means for transmitting motion to the jointed shaft from the shaft journaled in the arched frame.

In testimony whereof I affix my signature in presence of two witnesses.

JOHN J. VICKERS.

Witnesses:
JAS. B. DARBY,
H. C. JONES.